United States Patent
Fan et al.

(10) Patent No.: US 8,621,067 B2
(45) Date of Patent: Dec. 31, 2013

(54) APPARATUS AND METHOD FOR MANAGING COMMUNICATIONS

(75) Inventors: James Fan, San Ramon, CA (US);
Lipton Chin-Loy, Duluth, GA (US);
Richard Kuo, Mountain View, CA (US);
Jennifer Lam, Fremont, CA (US);
Chandrasekaran Sundaramurthy,
Holmdel, NJ (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 0 days.

(21) Appl. No.: 12/557,202

(22) Filed: Sep. 10, 2009

(65) Prior Publication Data

US 2011/0060822 A1 Mar. 10, 2011

(51) Int. Cl.
*G06F 15/173* (2006.01)
*G06F 15/16* (2006.01)

(52) U.S. Cl.
USPC .......... 709/224; 709/223; 709/225; 709/226; 709/227; 709/228; 709/229; 709/238; 709/239; 709/249; 709/250

(58) Field of Classification Search
USPC ............... 709/223–225, 238–239, 249–250
See application file for complete search history.

(56) References Cited

U.S. PATENT DOCUMENTS

| | | | | |
|---|---|---|---|---|
| 6,173,322 B1 * | 1/2001 | Hu | | 709/224 |
| 6,292,905 B1 * | 9/2001 | Wallach et al. | | 714/4.12 |
| 7,171,467 B2 * | 1/2007 | Carley | | 709/224 |
| 7,647,422 B2 * | 1/2010 | Singh et al. | | 709/238 |
| 7,809,366 B2 * | 10/2010 | Rao et al. | | 455/419 |
| 7,813,265 B2 * | 10/2010 | Patel et al. | | 370/217 |
| 8,340,076 B2 * | 12/2012 | Jetcheva et al. | | 370/351 |
| 8,370,450 B2 * | 2/2013 | Venkatasubramanian | | 709/216 |
| 2001/0039574 A1 * | 11/2001 | Cowan et al. | | 709/223 |
| 2002/0120744 A1 * | 8/2002 | Chellis et al. | | 709/226 |
| 2003/0065712 A1 * | 4/2003 | Cheung et al. | | 709/203 |
| 2003/0088698 A1 * | 5/2003 | Singh et al. | | 709/239 |
| 2004/0078450 A1 * | 4/2004 | Chen et al. | | 709/214 |
| 2005/0228879 A1 * | 10/2005 | Cherkasova et al. | | 709/224 |
| 2006/0236325 A1 * | 10/2006 | Rao et al. | | 719/315 |
| 2007/0073874 A1 * | 3/2007 | Moghaddam et al. | | 709/224 |
| 2007/0214280 A1 * | 9/2007 | Patel et al. | | 709/239 |
| 2007/0294385 A1 * | 12/2007 | Kapadekar et al. | | 709/223 |
| 2008/0052401 A1 * | 2/2008 | Bugenhagen et al. | | 709/227 |
| 2008/0065746 A1 * | 3/2008 | Moghaddam et al. | | 709/220 |
| 2008/0065753 A1 * | 3/2008 | Rao | | 709/223 |
| 2008/0114862 A1 * | 5/2008 | Moghaddam et al. | | 709/220 |
| 2008/0177767 A1 * | 7/2008 | Lin et al. | | 707/100 |
| 2008/0183891 A1 * | 7/2008 | Ni et al. | | 709/239 |
| 2009/0190531 A1 * | 7/2009 | Jetcheva et al. | | 370/328 |
| 2010/0132022 A1 * | 5/2010 | Venkatasubramanian | | 726/7 |

\* cited by examiner

*Primary Examiner* — Emmanuel L Moise
*Assistant Examiner* — Edward Kim
(74) *Attorney, Agent, or Firm* — Guntin & Gust, PLC; Douglas Schnabel (57) ABSTRACT

A system that incorporates teachings of the present disclosure may include, for example, a gateway having a controller to transport media data between a service provider network and one or more end user devices associated with the gateway, and transmit connection signals to a second gateway for establishing a management channel between the gateway and the service provider network when an undesired condition is detected, where the management channel transports management data associated with the gateway to the second gateway for transport to the service provider network using a separate transport queue of the second gateway. Other embodiments are disclosed.

13 Claims, 8 Drawing Sheets

APPARATUS AND METHOD FOR MANAGING COMMUNICATIONS

FIELD OF THE DISCLOSURE

The present disclosure relates generally to communication systems and more specifically to an apparatus and method for managing communications.

BACKGROUND

Service providers often provide a plurality of communication services to users, including voice, video and data services. These services can be routed through common devices which can create servicing difficulties when the common devices are not functioning properly.

DETAILED DESCRIPTION

One embodiment of the present disclosure can entail a computer-readable storage medium comprising computer instructions to detect a connection failure between a first gateway and a service provider network where the first gateway is operable to transport voice, video and data communications between the service provider network and one or more end user devices associated with the first gateway, determine one or more second gateways in communication with the first gateway, determine a resource capacity of the second gateways, select at least one of the second gateways that satisfies a threshold associated with the resource capacity, transmit connection signals to the selected second gateway for establishing a management channel between the first gateway and the selected second gateway, where the management channel transports management data associated with the first gateway to the selected second gateway for transport to the service provider network using a separate transport queue of the selected second gateway.

Another embodiment of the present disclosure can entail a gateway having a controller to transport media data between a service provider network and one or more end user devices associated with the gateway, and transmit connection signals to a second gateway for establishing a management channel between the gateway and the service provider network when an undesired condition is detected, where the management channel transports management data associated with the gateway to the second gateway for transport to the service provider network using a separate transport queue of the second gateway.

Yet another embodiment of the present disclosure can entail a method including detecting an undesired condition between a first gateway and a service provider network where the first gateway is operable to transport media communications between the service provider network and one or more first end user devices associated with the first gateway, and receiving management data from a second gateway, the second gateway being operable to transport media communications between the service provider network and one or more second end user devices associated with the second gateway, wherein the first and second gateways are remote from each other, wherein the management data associated with the first gateway was transported along a management channel established between the first and second gateways.

Figure 1:
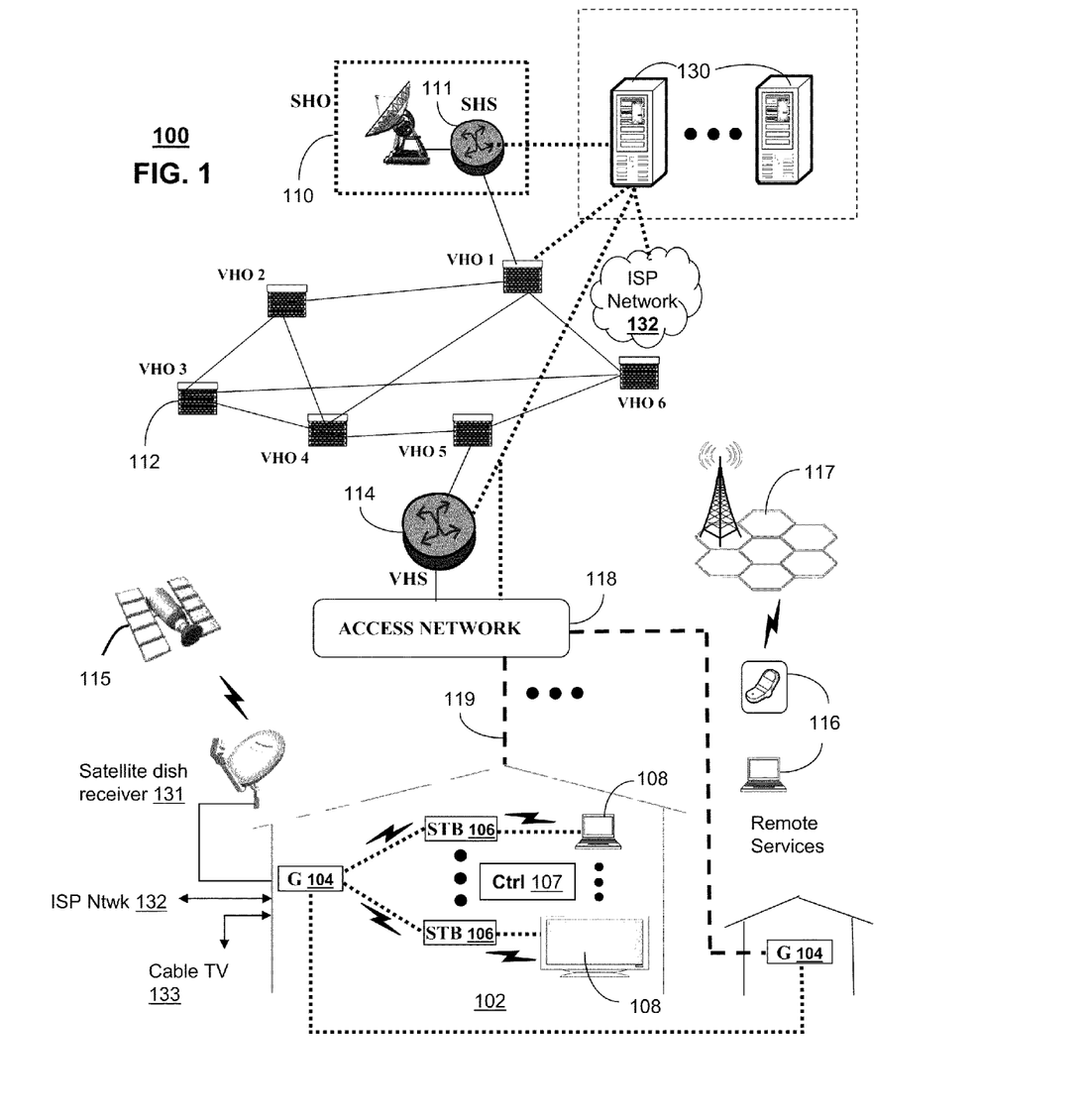
FIG. 1 depicts an illustrative embodiment of a communication system that provides media services.

FIG. 1 depicts an illustrative embodiment of a first communication system 100 for delivering media content. The communication system 100 can represent an Internet Protocol Television (IPTV) broadcast media system. The IPTV media system can include a super head-end office (SHO) 110 with at least one super headend office server (SHS) 111 which receives media content from satellite and/or terrestrial communication systems. In the present context, media content can represent audio content, moving image content such as videos, still image content, or combinations thereof. The SHS server 111 can forward packets associated with the media content to video head-end servers (VHS) 114 via a network of video head-end offices (VHO) 112 according to a common multicast communication protocol.

The VHS 114 can distribute multimedia broadcast programs via an access network 118 to commercial and/or residential buildings 102 housing a gateway 104 (such as a common residential or commercial gateway). The access network 118 can represent a group of digital subscriber line access multiplexers (DSLAMs) located in a central office or a service area interface that provide broadband services over optical links or copper twisted pairs 119 to buildings 102. The gateway 104 can use common communication technology to distribute broadcast signals to media processors 106 such as Set-Top Boxes (STBs) which in turn present broadcast channels to media devices 108 such as computers or television sets managed in some instances by a media controller 107 (such as an infrared or RF remote control).

The gateway 104, the media processors 106, and media devices 108 can utilize tethered interface technologies (such as coaxial or phone line wiring) or can operate over a common wireless access protocol. With these interfaces, unicast communications can be invoked between the media processors 106 and subsystems of the IPTV media system for services such as video-on-demand (VoD), browsing an electronic programming guide (EPG), or other infrastructure services.

Some of the network elements of the IPTV media system can be coupled to one or more computing devices 130 a portion of which can operate as a web server for providing portal services over an Internet Service Provider (ISP) network 132 to wireline media devices 108 or wireless communication devices 116 by way of a wireless access base station 117 operating according to common wireless access protocols such as Wireless Fidelity (WiFi), or cellular communication technologies (such as GSM, CDMA, UMTS, WiMAX, Software Defined Radio or SDR, and so on).

It will be appreciated by an artisan of ordinary skill in the art that a satellite broadcast television system can be used in place of the IPTV media system. In this embodiment, signals transmitted by a satellite 115 supplying media content can be intercepted by a common satellite dish receiver 131 coupled to the building 102. Modulated signals intercepted by the satellite dish receiver 131 can be submitted to the media processors 106 for generating broadcast channels which can be presented at the media devices 108. The media processors 106 can be equipped with a broadband port to the ISP network 132 to enable infrastructure services such as VoD and EPG described above.

In yet another embodiment, an analog or digital broadcast distribution system such as cable TV system 133 can be used in place of the IPTV media system described above. In this embodiment the cable TV system 133 can provide Internet, telephony, and interactive media services.

In one embodiment, the gateways 104 of distinct users can be in communication with each other and can facilitate communications between the Service Provider and one or more gateways that are experiencing problems or are experiencing other undesired conditions, such as traffic capacity. It follows from the above illustrations that the present disclosure can apply to any present or future interactive media content services.

Figure 2:
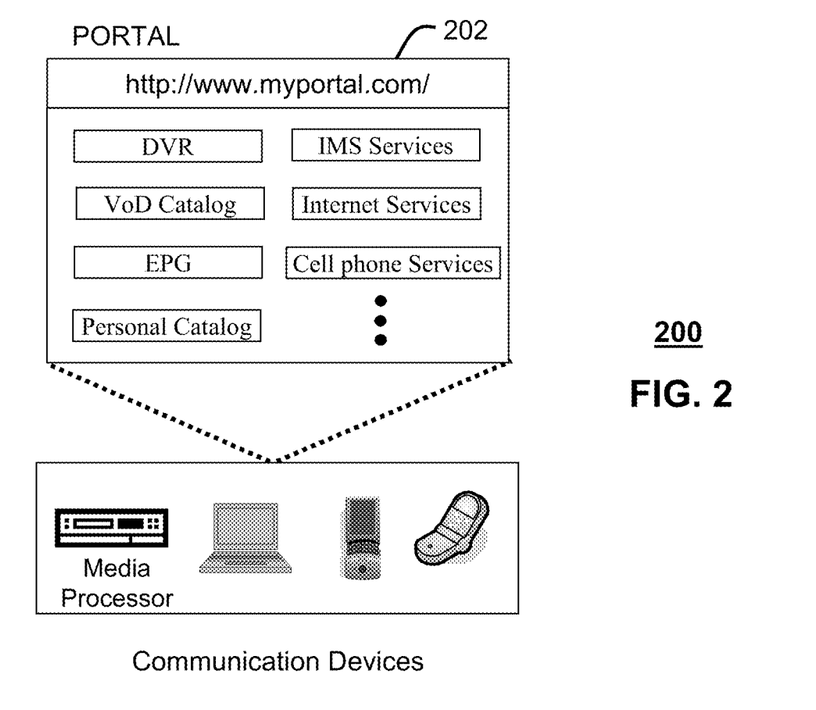
FIG. 2 depicts an illustrative embodiment of a portal interacting with the communication system of FIG. 1.

FIG. 2 depicts an illustrative embodiment of a portal 202 which can operate from the computing devices 130 described earlier of communication system 100 illustrated in FIG. 1. The portal 202 can be used for managing services of communication system 100. The portal 202 can be accessed by a Uniform Resource Locator (URL) with a common Internet browser such as Microsoft's Internet Explorer™ using an Internet-capable communication device such as those described for FIG. 1. The portal 202 can be configured, for example, to access a media processor 106 and services managed thereby such as a Digital Video Recorder (DVR), a VoD catalog, an EPG, a personal catalog (such as personal videos, pictures, audio recordings, etc.) stored in the media processor, provisioning IMS services described earlier, provisioning Internet services, provisioning cellular phone services, and so on.

Figure 3:
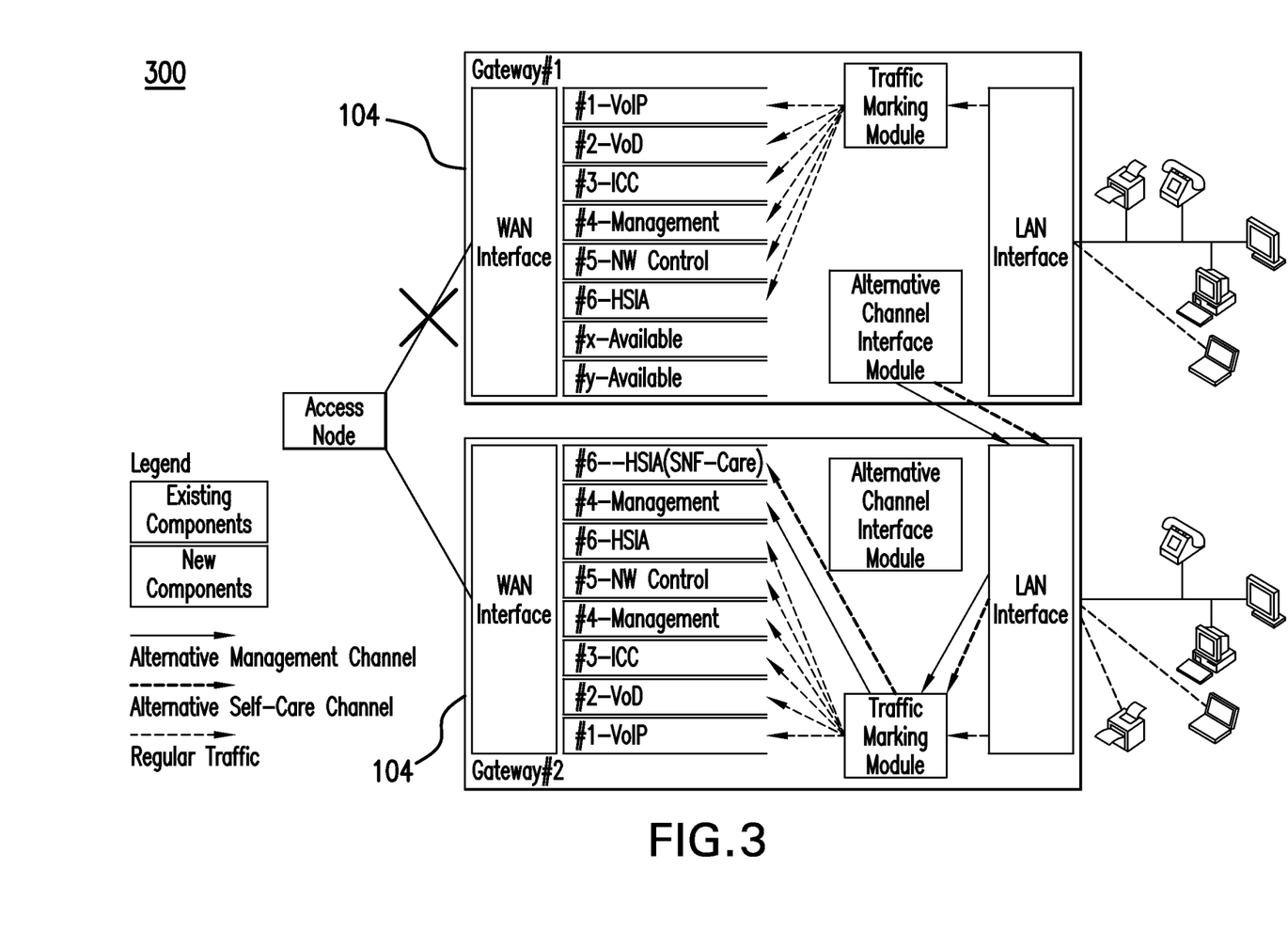
FIGS. 3-6 depict illustrative embodiments of communication system that provide media services.

FIG. 3 depicts an exemplary embodiment of a communication system 300 for delivering media content. Communication system 300 can be overlaid or operably coupled with communication system 100 as another representative embodiment of said communication systems. System 300 can include a plurality of gateways, such as residential gateways 104. The gateways 104 can be in communication with various network devices as well as various customer premises equipment for the delivery of voice, video and data services. System 300 can utilize various protocols, techniques and combinations thereof for transmitting the requested media content to the gateway 104, including WiFi, WiMax, GPRS, 3G, 4G and so forth. System 300 can also utilize various protocols, techniques and combinations thereof for transmitting the requested media content to various points throughout the system, including use of an IPTV access network, the public Internet, and/or an IMS network. Delivery of the services can be to a variety of user end devices, including STB's, TV's, PCs, laptops, PDAs, mobile phones and any other device capable of receiving and presenting media content.

System 300 provides for a gateway 104 to initiate the establishment of alternative management and self-care connections to the Service Provider's network via neighboring gateway(s). System 300 also allows a network to request a neighboring gateway 104 to temporarily establish an alternative management channel on behalf of the disconnected gateway. This has a number of benefits: improve customer positive experience; improve trouble shooting effectiveness; enable self-care capability during the period of lost connectivity; and enhance robustness of 'home to WAN' network design.

The gateways 104 can comprise a number of modules that can be hardware, software or a combination of both. The gateways 104 can include a WAN interface module that enables the gateway to WAN side connection. This module can include a plurality of traffic queues (e.g., six). The queues can be used based on a priority of traffic. The gateways 104 can include a LAN Interface module that enables the gateway to LAN side of CPE connections. The gateways 104 can include a traffic marking module that will mark traffic class and place appropriate traffic class into the right priority queue.

In one embodiment, additional queues can be added to the WAN interface module. The first queue can be configured as a secondary management queue to handle management traffic from another gateway. The second queue can be configured as the alternative self-care queue to handle self-care traffic from another gateway. The secondary management queue can have the same level of priority with the management queue. The alternative self-care queue can have the same priority with the High Speed Internet (HSIA). In one embodiment, the self-care queue will carry a higher weight since HSIA uses a Best Effort method. The gateways can also include an alternative channel interface module to support the setup of alternative management and self-care internet channels via a neighboring gateway.

Figure 4:
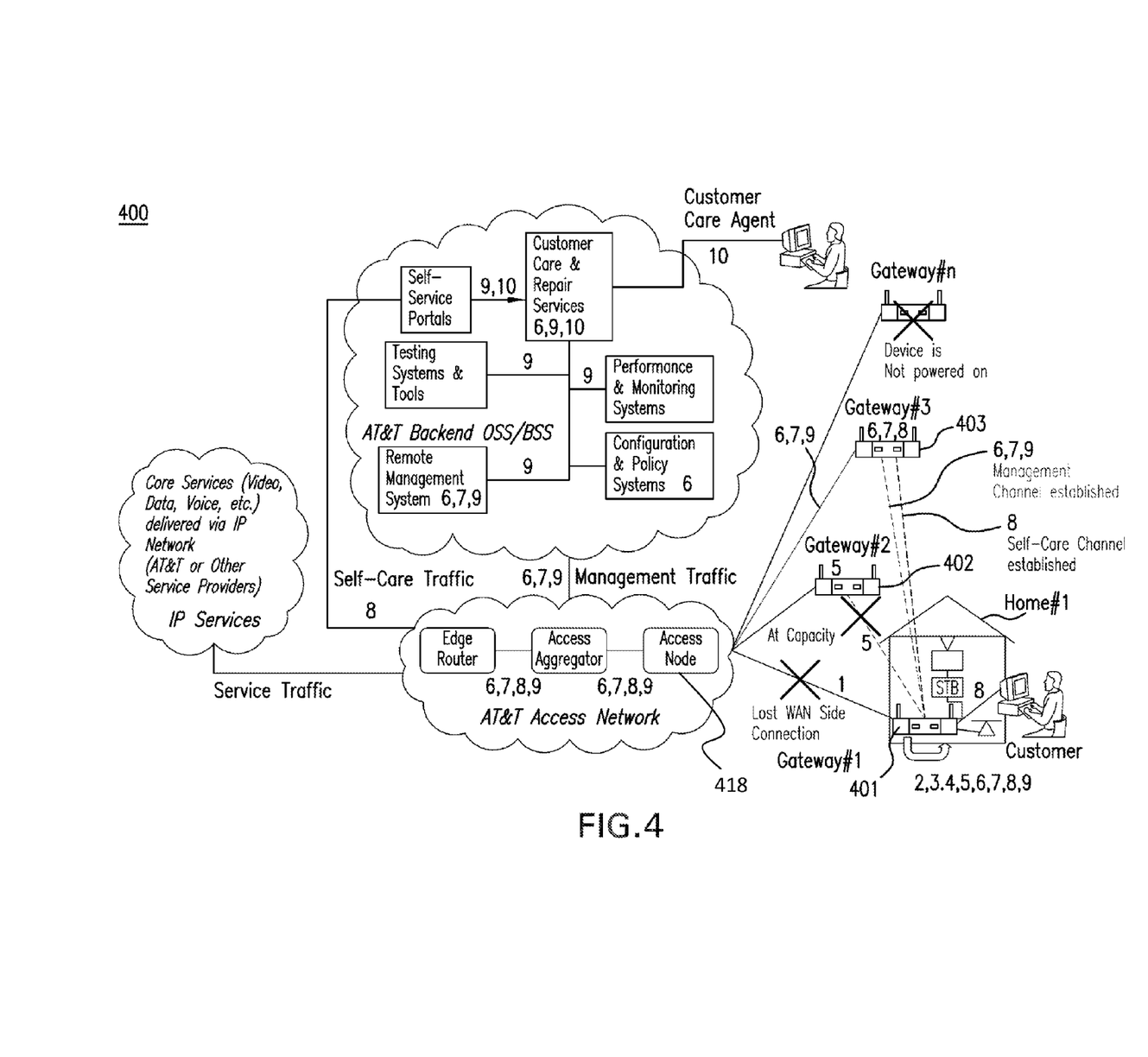

Referring additionally to FIG. 4, a communication system 400 is shown where a loss of WAN connection has been detected by the gateway. The self-healing module of the gateway can trigger a request to set up a Home to Network and Network to Home backup management channel(s) via one or more neighboring gateways. When a user attempts to solve the problem via the Internet, the gateway can establish an alternative self-care channel through the neighboring gateways.

In system 400, the connection between Gateway 401 and the access node 418 is down. The self-healing module in gateway 401 can execute the diagnostic routines, but may be unable to re-establish the connection. The self-healing module can then request the gateway interface module to detect all available neighboring gateways. In this case, only gateway 402 and gateway 403 have been detected gateway #n is now powered down.

The gateway interface module can verify with its policy module to make sure that gateway 402 and gateway 403 have the appropriate credentials to be the host for establishing backup management and self-care connections. Gateway 401 can make an attempt to connect to gateway 402 with a pair of pre-configured encryption codes. The connection may be rejected by gateway 402 since it is already at capacity.

Gateway 401 can then make an attempt to connect to gateway 403 with a pair of encrypted codes to progress a mutual authentication process. The connection can be accepted and the management channel can be established. Because the management traffic of gateway 401 can be totally separated from the native traffic of gateway 403, a separate queue can be used to carry this management traffic. Traffic marking and routing policies can be configured in an upstream access node, aggregation node and edge router. Remote Management System, Configuration & Policy System and Customer Care & Repair Service System can be updated with the new management channel information. The management traffic of gateway 401 can now be routed through the WAN connection of gateway 403.

In one embodiment where the user detects the loss of the WAN connection, he or she can utilize the self-care module to report or solve the problem. Gateway 401 can attempt to establish a self-care channel via gateway 403. The traffic class can be made best effort with a higher weight assigned. This Self-Care traffic can be forced to be routed to the self-service portal. From the self-service portal, the user can invoke various diagnostic features via the customer care & repair service system. The system can correlate results from testing, performance system and remote management systems to determine trouble fix procedures. If the self-care fails to resolve the problem; a trouble ticket can be created in the customer care & repair service system. The trouble ticket can be routed to a customer care agent for resolution.

Figure 5:
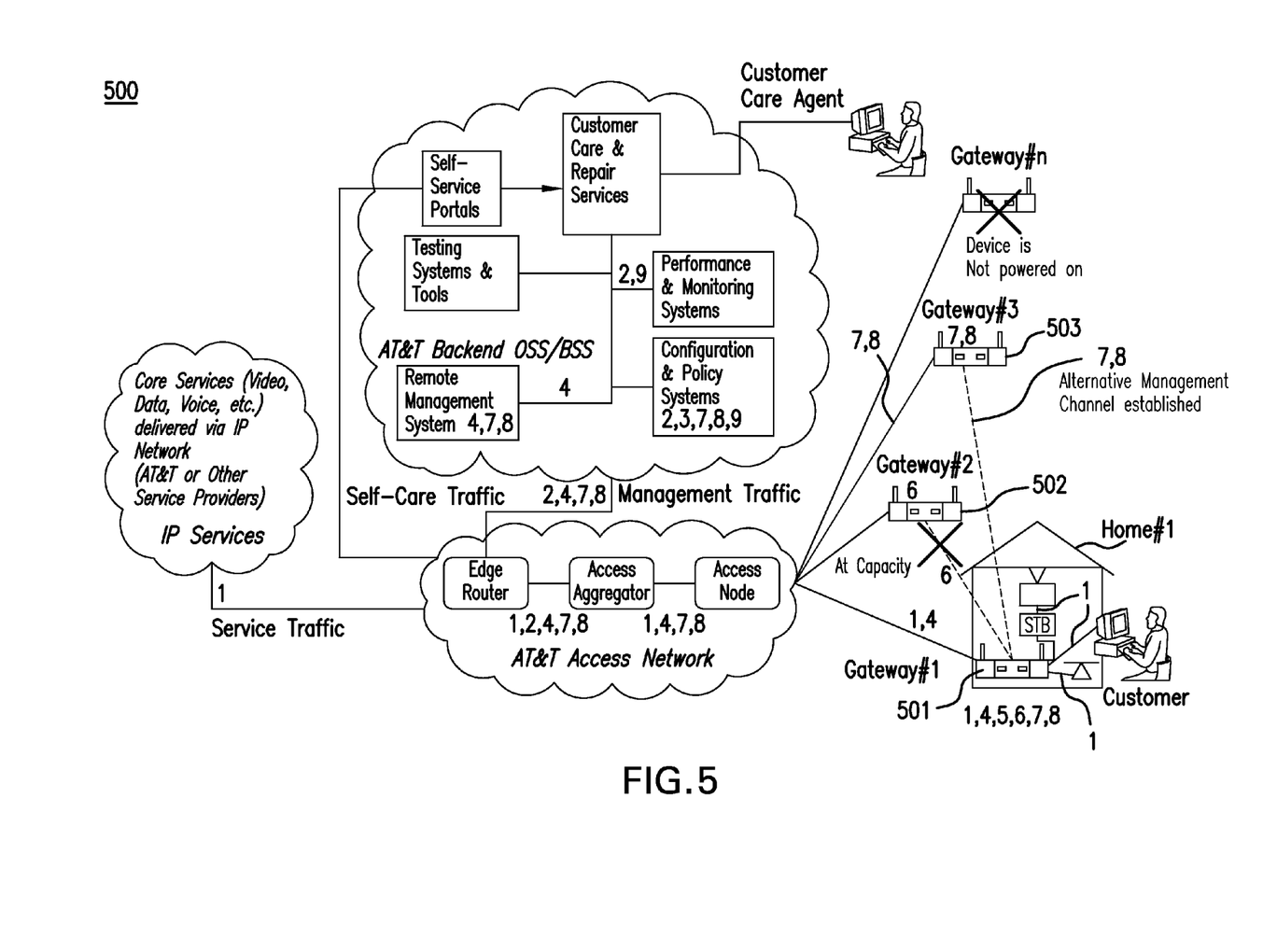

Referring to FIG. 5, a communication system 500 is shown where the peak upstream or downstream traffic load between a gateway and WAN connection is detected. The policy management system can initiate a request to set up a secondary management channel through a neighboring gateway to carry all management traffic.

In system 500, the user can be receiving various services delivered from the Core Services IP network to gateway 501. The access aggregator can detect that the logical port serving gateway 501 is at peak capacity and some of the management traffic is being delayed. An alert can be delivered to the performance & monitoring systems through the edge router. A notification message can be sent to the configuration & policy management systems through the edge router. The configuration & policy management systems can determine that an alternative management channel can be used to divert all gateway 501 management traffic. The configuration & policy management systems can request the remote management system to order gateway 501 to set up an alternative management channel. Gateway 501 can detect the accessibility of gateway 502 and gateway 503. Gateway 501 can make an attempt to connect to gateway 502 with a pre-configured pair of encrypted codes. The LAN interface module of gateway 502 can consult with its configuration, security & policy module and can determine whether gateway 502 is already at capacity. The connection request can be rejected in such a case.

Gateway 501 can make an attempt to connect to gateway 503 with the pair of encrypted codes to progress a mutual authentication process. If the connection is accepted then the management channel is established. Because the management traffic of gateway 501 can be totally separated from the native traffic of gateway 503, a separate queue can be used to carry this management traffic. Traffic marking and routing policies can be configured in an upstream access node, aggregation node and edge router. Remote Management System, Configuration & Policy System and Customer Care & Repair Service System can be updated with the new management channel information.

Management traffic of gateway 501 can now be routed through the WAN connection of gateway 503 via a different virtual channel totally separated from the native traffic of gateway 503. The Configuration & Policy Management Systems can send a message to notify the Monitoring & Performance Systems that gateway 501's management traffic has been rerouted through gateway 503 to surpass the above-described.

Figure 6:
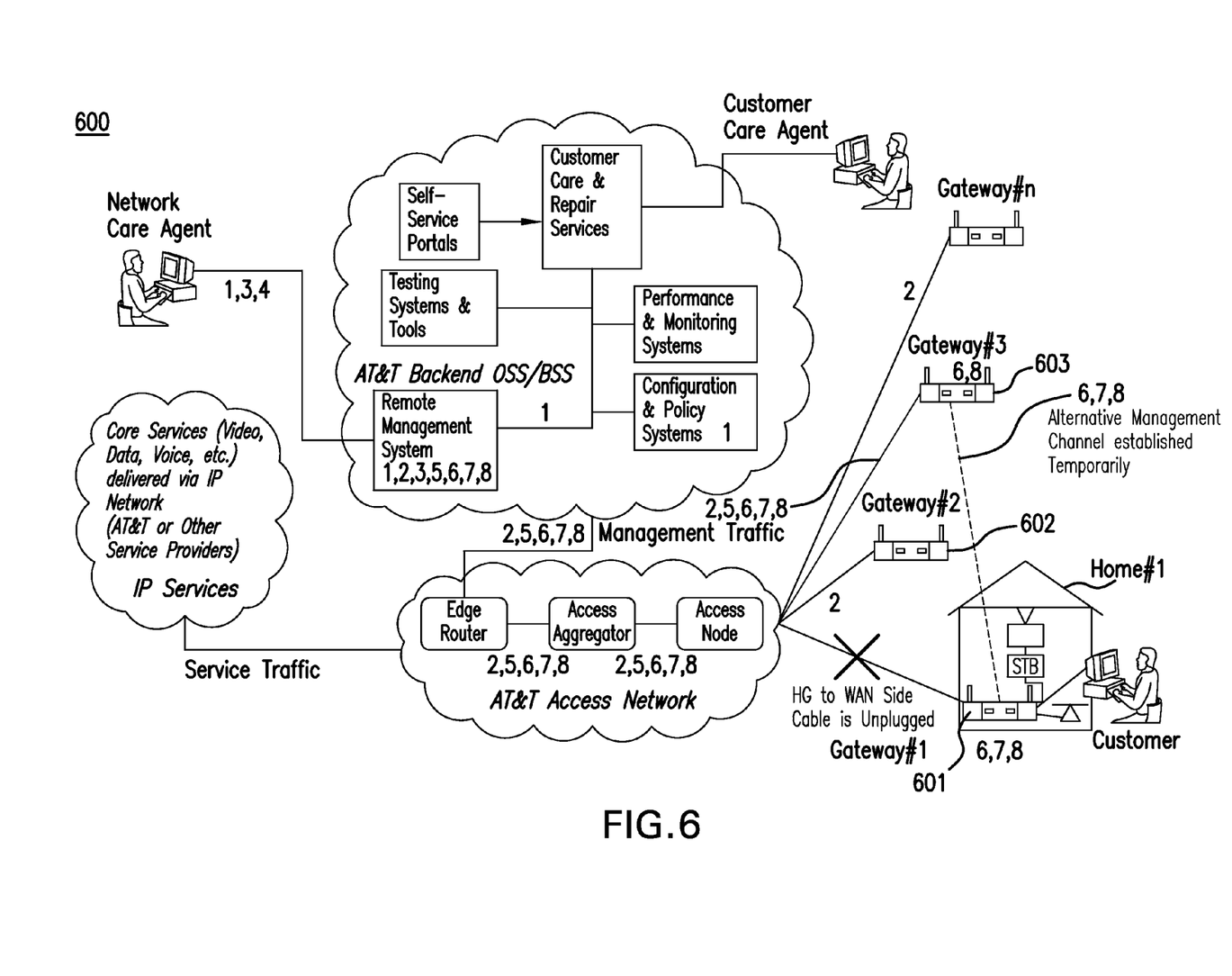

Referring to FIG. 6, a communication system 600 is shown where the gateway 601 is temporarily disconnected (but still fully functioning) from the WAN possibly because a cable is unplugged. In system 600, the network can initiate a request to a neighboring gateway to establish an alternative management channel on behalf of the disconnected gateway so that urgent firmware/software/policy updates can be applied in time.

In system 600, the network care agent can receive an urgent notification that a major firmware/software upgrade along with a set of new policies needs to be pushed to gateways within a certain time period. The network care agent can ensure that the Remote Management System gets the needed version of firmware/software along with a set of policies (from the Configuration & Policy Management Systems). The Remote Management System can proactively access the gateways such as gateways 602 and 603, but in this example, the system is unsuccessful in communicating with gateway 601 (e.g., due to unplugged cable at home).

A status report can be sent to the network care agent for action. The network care agent can direct the Remote Management System to setup a network initiated alternative management channel for gateway 601. The Remote Management System can locate gateway 601's alternative channel profile and detect that gateway 603 has the top priority. The Remote Management System can then access gateway 603 to assess its current traffic status. The Remote Management System can direct gateway 603 to setup a temporary alternative management channel on behalf of gateway 601. The Remote Management System can push new firmware/gateway and policies to gateway 601. The Remote Management System can direct gateway 603 to disconnect the temporary alternative management channel.

Figure 7:
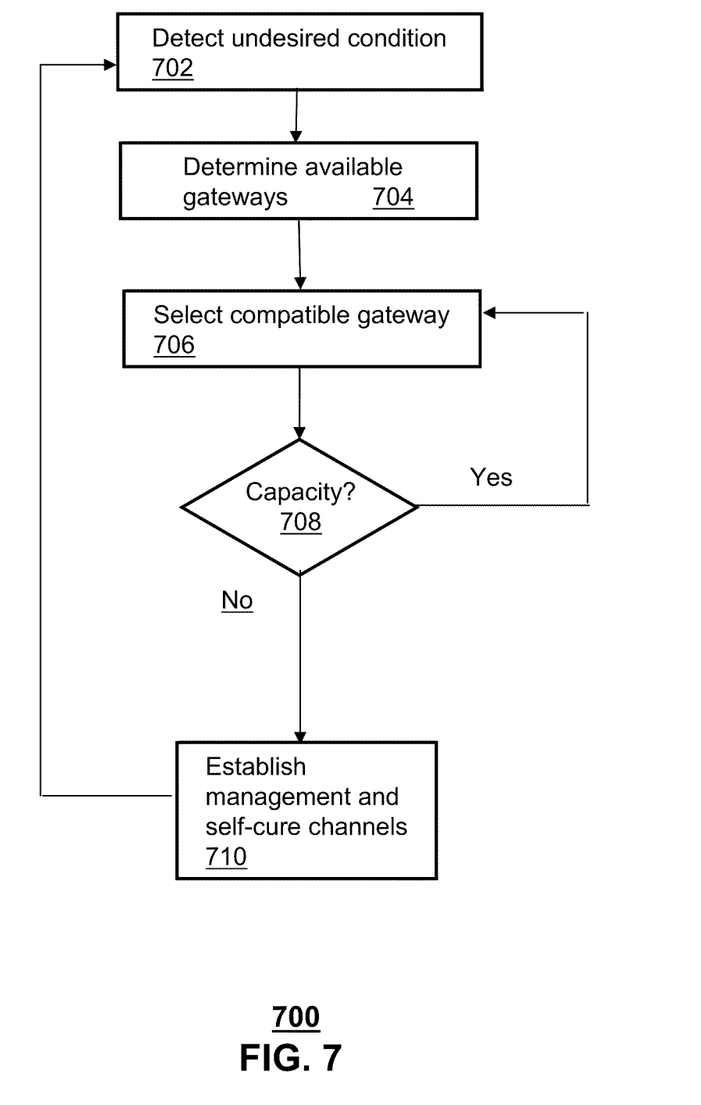
FIG. 7 depicts an illustrative embodiment of a method operating in portions of the communication systems of FIGS. 1 and 3-6.

FIG. 7 depicts an illustrative method 700 operating in portions of communication systems 100 and 300-600. Method 700 can begin with step 702 in which an undesired condition can be detected. The condition can be a loss of connection between the ISP WAN and the gateway, a gateway failure and/or a gateway operating at or near to capacity. The condition can be detected by the gateway, by a network device or both. For example, a network device can desire to download updates to a gateway and attempt to establish a link with the gateway.

In step 704, available gateway devices can be determined. The gateways can be neighboring devices, such as in the same neighborhood or can be otherwise associated with the selected gateway. In one embodiment, the available gateways can be gateways that are associated with different users but are available for communication with each other. The determination of the available gateways can be made by the selected gateway, by a network device or both. In one embodiment, a database of available gateways can be maintained by the network. In another embodiment, available gateway data can be maintained by each of the gateways, such as by periodically communicating with each other to maintain status information.

In step 706, one or more of the available gateways can be selected. The selection can be made by the gateway, by a network device or by both. The selection can be made based on communication amongst the gateways, such as obtaining capability and capacity information of available gateways. The capacity of the selected gateway can be determined in step 708 and if resources are available then the selected gateway can be utilized for establishing management and/or self-cure channels for the distressed gateway in step 710. Where a management channel is established, separate queues can be utilized by the selected gateway for transporting management data and native data (the gateways own management and media data). In this exemplary embodiment, management data can be distinct from media data where the management data are those signals that are used to control and otherwise establish transport for the media content.

Upon reviewing the aforementioned embodiments, it would be evident to an artisan with ordinary skill in the art that said embodiments can be modified, reduced, or enhanced without departing from the scope and spirit of the claims described below. For example, a distressed gateway can establish a plurality of management channels using a plurality of other gateways. In another embodiment, the use of neighboring gateways can be monitored and adjusted based on various factors, including service plans, predicted capacity and so forth.

Other suitable modifications can be applied to the present disclosure without departing from the scope of the claims below. Accordingly, the reader is directed to the claims section for a fuller understanding of the breadth and scope of the present disclosure.

Figure 8:
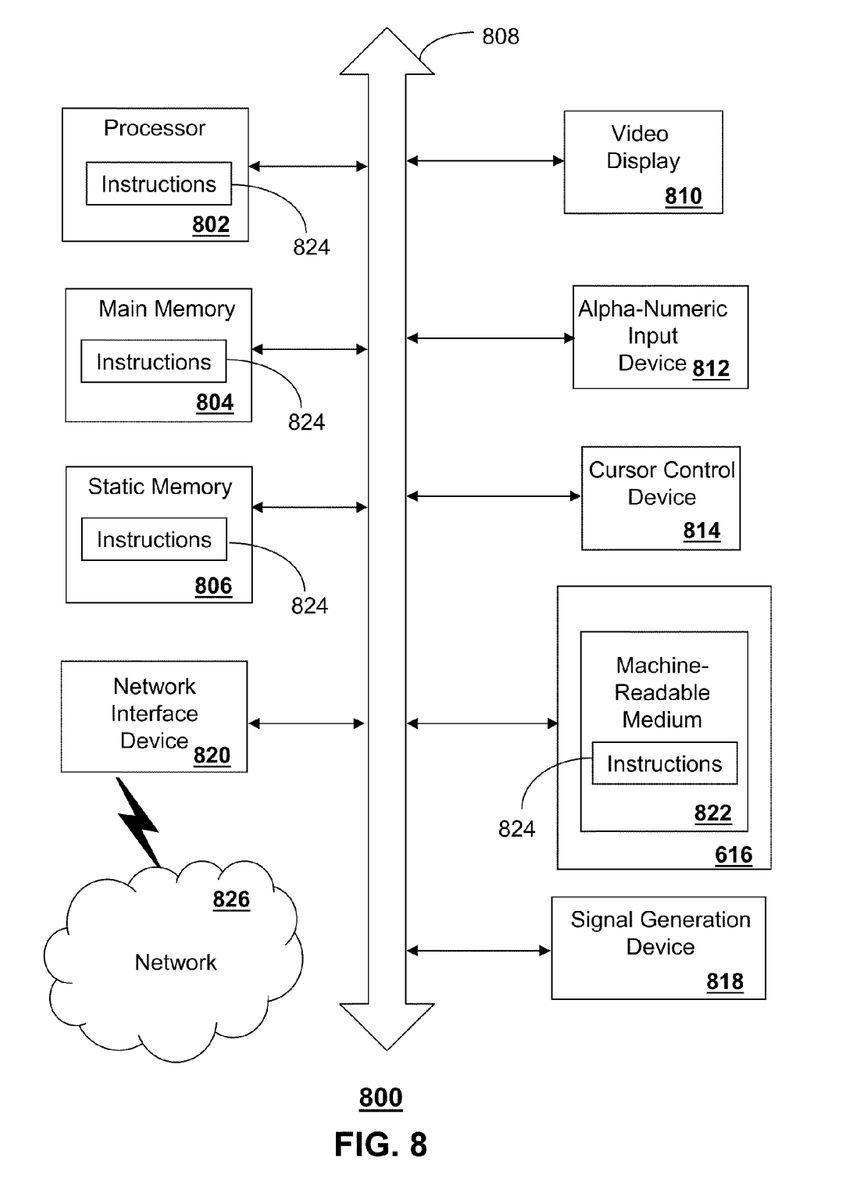
FIG. 8 is a diagrammatic representation of a machine in the form of a computer system within which a set of instructions, when executed, may cause the machine to perform any one or more of the methodologies discussed herein.

FIG. 8 depicts an exemplary diagrammatic representation of a machine in the form of a computer system 800 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 800 may include a processor 802 (e.g., a central processing unit (CPU), a graphics processing unit (GPU, or both), a main memory 804 and a static memory 806, which communicate with each other via a bus 808. The computer system 800 may further include a video display unit 810 (e.g., a liquid crystal display (LCD), a flat panel, a solid state display, or a cathode ray tube (CRT)). The computer system 800 may include an input device 812 (e.g., a keyboard), a cursor control device 814 (e.g., a mouse), a disk drive unit 816, a signal generation device 818 (e.g., a speaker or remote control) and a network interface device 820.

The disk drive unit 816 may include a machine-readable medium 822 on which is stored one or more sets of instructions (e.g., software 824) embodying any one or more of the methodologies or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 824, or that which receives and executes instructions 824 from a propagated signal so that a device connected to a network environment 826 can send or receive voice, video or data, and to communicate over the network 826 using the instructions 824. The instructions 824 may further be transmitted or received over a network 826 via the network interface device 820.

While the machine-readable medium 822 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A computer-readable non-transitory storage medium comprising instructions which, responsive to being executed by a processor, cause the processor to perform operations comprising:

detecting at a first gateway a connection failure between the first gateway and an access node to a service provider network, wherein the first gateway is communicatively coupled between the access node to the service provider network and a first end user device associated with the first gateway, wherein the first gateway is part of a first local network;

accessing at the first gateway a database of the service provider network responsive to detecting the connection failure, wherein the database identifies a second gateway that is communicatively coupled to the first gateway and is communicatively coupled to the access node, wherein the second gateway is part of a second local network;

selecting the second gateway from the database, wherein the second gateway supports a primary management queue and a primary self-care queue for handling messaging traffic between the second local network and the service provider network, and wherein the second gateway is not part of the first local network;

transmitting connection signals from the first gateway to the second gateway to establish a self-care channel between the first gateway and the second gateway, wherein the second gateway designates an alternative management queue and an alternative self-care channel for routing messaging traffic between the first end user device and the service provider network via the first gateway and the second gateway, wherein the routing of the messaging traffic is according to a priority designation;

routing self-care traffic from the first gateway to a self-service portal through the alternative self-care channel of the second gateway to support diagnostic features;

receiving an update of one of firmware, software, or policy associated with the first gateway via the alternative management queue of the second gateway, wherein the alternative management queue handles management traffic for the first gateway; and transmitting data associated with user-reporting of the connection failure to the service provider network through the self-service portal.

2. The non-transitory storage medium of claim 1, wherein the connection signals comprise pre-configured encryption codes.

3. The non-transitory storage medium of claim 1, wherein the operations further comprise designating traffic at the first gateway for transport along a separate transport queue.

4. The non-transitory storage medium of claim 1, wherein the service provider network correlates results from the diagnostic features to determine trouble fix procedures.

5. A gateway device, comprising:
   a memory to store instructions; and
   a processor coupled to the memory, wherein the processor, responsive to executing the instructions, performs operations comprising:

transporting media data between a service provider network and a first end user device by way of an access node to the service provider network, wherein the gateway device is part of a first local network;

detecting a reduced connectivity to the service provider network;

accessing a database of the service provider network responsive to detecting the reduced connectivity, wherein the database comprises a second gateway that is communicatively coupled to the first gateway and is communicatively coupled to the access node, wherein the second gateway is part of a second local network;

selecting the second gateway of the database, wherein the second gateway supports a primary management queue and a primary self-care queue for handling messaging traffic between a second end user device and the service provider network, and wherein the second gateway is not part of the first local network;

transmitting connection signals to the second gateway to establish a self-care channel on the second gateway, wherein the second gateway designates an alternative management queue and an alternative self-care channel for routing messaging traffic according to a priority designation between the first end user device and the service provider network via the gateway device and the second gateway;

routing self-care traffic from the gateway device to a self-service portal through the alternative self-care channel of the second gateway to support diagnostic features; and receiving an update of one of firmware, software, or policy associated with the gateway device via the alternative management queue of the second gateway, wherein the alternative management queue handles management traffic for the gateway device;

transporting data associated with user-reporting of the reduced connectivity to the service provider network through the self-service portal at the alternative self-care channel of the second gateway.

6. The gateway device of claim 5, wherein the processor, responsive to executing the instructions, performs operations comprising determining a resource capacity of the second gateway, wherein the second gateway is selected from the database based on a threshold associated with the resource capacity.

7. The gateway device of claim 5, wherein the processor, responsive to executing the instructions, performs operations comprising designating self-care traffic at the gateway for transport along a separate transport queue.

8. A method comprising:
  detecting, by a system comprising a processor, a reduced connectivity between a first gateway and a service provider network, wherein the first gateway is communicatively coupled to the service provider network by way of an access node, wherein the first gateway is communicatively coupled to a first end user device associated with the first gateway, and wherein the first gateway is part of a first local network;
  accessing, by the system, a database of the service provider network responsive to detecting the reduced connectivity, wherein the database comprises a second gateway that is communicatively coupled to the first gateway and is communicatively coupled to the access node, wherein the second gateway is part of a second local network;
  selecting, by the system, a second gateway of the database, wherein the second gateway supports a primary management queue and a primary self care queue for handling messaging traffic between a second end user device and the service provider network, and wherein the second gateway is not part of the first local network;
  transmitting, by the system, connection signals from the first gateway to the second gateway to provision the second gateway to transport data associated with a self-care channel for the first gateway to the service provider network by way of the second gateway, wherein the second gateway designates an alternative management queue and an alternative self-care channel for routing messaging traffic according to a priority designation between the first end user device and the service provider network via the first gateway and the second gateway;
  routing self-care traffic from the first gateway to a self-service portal through the alternative self-care channel of the second gateway to support diagnostic features; and
  receiving an update of one of firmware, software, or policy associated with the first gateway via the alternative management queue of the second gateway, wherein the alternative management queue handles management traffic for the first gateway;
  transmitting, by the system, data associated with user-reporting of the reduced connectivity to the service provider network through the self-service portal by way of the alternative self-care channel.

9. The method of claim 8, wherein data associated with user-reporting of the reduced connectivity is transported from a separate transport queue of the second gateway.

10. The method of claim 8, wherein the second gateway is selected based on a resource capacity associated with the second gateway.

11. The method of claim 8, wherein the reduced connectivity is associated with one of a resource capacity of the first gateway and a failed connectivity between the first gateway and the service provider network.

12. The method of claim 8, wherein the service provider network correlates results from the diagnostic features to determine trouble fix procedures.

13. The method of claim 8, comprising executing, by the system, diagnostic routines at the first gateway responsive to detecting the reduced connectivity.

\* \* \* \* \*